2,635,716

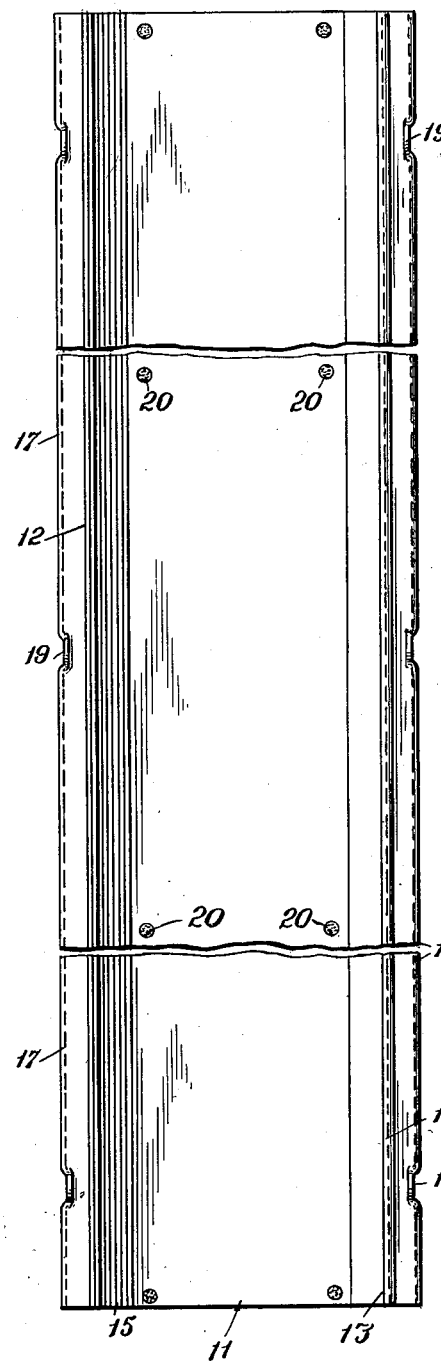
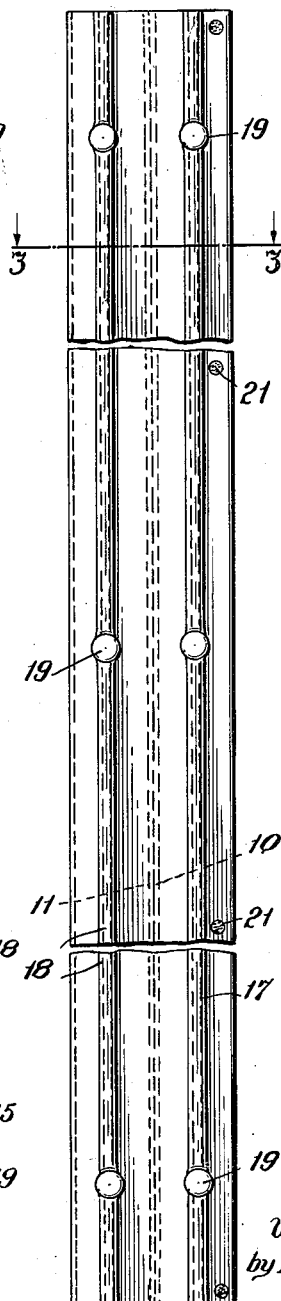
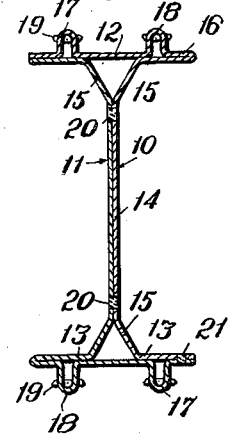
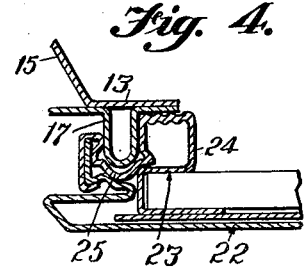
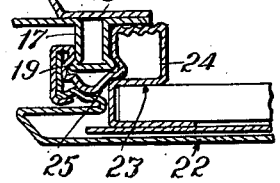
Inventor
Walter A. Mayes (Deceased)
by Esther O. Mayes, Executrix
By Bacon + Thomas
Attorneys Patented Apr. 21, 1953

UNITED STATES PATENT OFFICE 2,635,716

STUD

Walter A. Mayes, deceased, late of York, Pa., by Esther Oswald Mayes, executrix, Glyndon, Md., assignor to Martin-Parry Corporation, York, Pa., a corporation of Delaware Application November 29, 1948, Serial No. 62,570

2 Claims. (Cl. 189—34)

1

This invention relates to improvements in prefabricated partitions and more particularly the invention is concerned with a novel form of stud for use in connection with the panels employed in constructing such partitions.

One object of the invention is to provide a stud which is light in weight, of high rigidity and which may be fabricated with facility from sheet metal stock.

A further object is to provide a stud which will cooperate directly with the panels of the partition in such a manner as to facilitate attachment of the panels to the studs.

A still further object is a stud which is so designed that it will be wholly concealed from view by the panels which are attached to it, this being accomplished without the aid of trim strips or the like.

The invention is illustrated in the accompanying drawing, in which:

Figure 1 is a side elevational view of a stud embodying the features of the invention;

Figure 2 is a front elevational view;

Figure 3 is an enlarged transverse section taken along line 3—3 of Figure 2;

Figure 4 is a fragmentary assembly view, in section, showing the stud and a panel associated therewith; and Figure 5 is a similar view at a different elevation showing the manner in which the panel is removably secured to the stud.

The stud, as best shown in Figure 3, is of the general shape of an I-beam. Preferably, it comprises an assembly of two pre-fabricated sheet metal sections 10 and 11. The stud section 10 is formed with a full flange 12 and a half flange 13, the full flange and the half flange being parallel, extending the full length of the stud and being connected by a web 14. The latter, throughout its central area, is normal to the full and half flange, but is connected to said flanges by marginal portions 15 which extend at acute angles with respect to the flanges.

It will be noted that in forming the full flange 12, a marginal edge 16 of double thickness is provided by the folding of the sheet metal upon itself.

Longitudinally-extending, spaced-apart, parallel ribs 17 and 18 are formed in the full flange 12. The said ribs are hollow and at regularly spaced points are indented so as to spread the ribs at such points and thereby provide enlargements 19.

The stud section 11 is similar to the section 10 except that it is arranged in reverse relation with respect to the latter, the webs of the two sections engaging one another in back-to-back relation. By so arranging the two stud sections, the latter may be assembled to form a structural element having spaced-apart, parallel flanges, each having parallel, spaced-apart hollow ribs which extend outwardly from the flanges. It will be noted in this connection that the marginal portions of the flanges of the stud are of double thickness as is the web.

The two sections of the stud may be secured together in any suitable manner. As illustrated, this is accomplished by spot welding web portions of the sections as indicated at 20 and by similarly welding the half flange of each of the stud sections to the full flange of the other as indicated at 21. The welding together of the stud sections in the manner described provides a stud which, although light in weight, is strong and of considerable rigidity.

The manner in which the stud may be employed to support the panels of a partition is illustrated in Figures 4 and 5. The panel indicated at 22 in these figures is of the type disclosed in the copending application of Walter A. Mayes and Mearl M. Fink, Serial No. 614,856, filed September 7, 1945, now abandoned. The panel 22, as illustrated, is of sheet metal, and includes a stiffening and attaching member 23 along each vertical edge. The stiffening and attaching members are formed to provide a hollow rib 24 and an adjacent parallel channel 25, the outer wall of the hollow rib being corrugated in the direction of its length to render the rib resilient. The channels 25 along the edges of the panel are adapted to accommodate the hollow ribs 17 and 18 of the studs, the walls which define the channels 25 resiliently engaging the enlargements 19 on the ribs to releasably hold the panel in place. The two hollow ribs on each side of the stud and the stiffening and attaching members on the panels are so formed that adjacent panels of the partition will be so supported that their adjacent edges will abut and thereby wholly conceal the stud.

It will be apparent that in constructing a partition, the panels may be attached to the stud simply by causing the hollow ribs 17 and 18 on the studs to enter the channels in the stiffening and attaching members on the panels, the walls of the channels 25 yielding to permit the panel to be snapped in place, or removed, as desired. The use of separate attaching elements or devices is thus avoided.

Although the stud has been illustrated in connection with a specific form of panel, it will be understood that such showing is by way of example only and that the features of the invention may be availed of to equal advantage in connection with other panel structures and assemblies.

What is claimed is:

1. A stud of the character described including similar pre-formed sections which are secured together to form a composite structural element, each of said sections having a full flange and a portion of a flange, said flange and portion of a flange occupying spaced-apart, parallel planes and being connected by a web which is located in a plane normal to the planes of said flange and portion of a flange, said sections being secured together in reverse arrangement and in back-to-back relation with the webs thereof in mutual contact, spaced, parallel hollow ribs extending longitudinally of said full flanges, and longitudinally spaced lateral projections on the sides of said ribs and which are adapted to be engaged by panels to be supported by said stud.

2. A stud of the character described, comprising: means defining an elongated stud body, a pair of spaced longitudinally extending hollow ribs projecting outwardly from said stud body, longitudinally spaced portions of the crests of said ribs being depressed inwardly and the side walls inwardly of said portions being bulged transversely to provide re-entrant surfaces adapted to be detachably engaged by panels to be supported by the stud.

ESTHER OSWALD MAYES,
*Executrix of the estate of Walter A. Mayes, deceased.*

References Cited in the file of this patent

UNITED STATES PATENTS

| Number | Name | Date |
|---|---|---|
| 916,356 | Myers | Mar. 23, 1909 |
| 991,603 | Brooks | May 9, 1911 |
| 1,457,303 | Higgins | June 5, 1923 |
| 1,997,876 | Sheldon | Apr. 16, 1935 |
| 2,051,064 | Worden | Aug. 18, 1936 |
| 2,137,677 | Pretot | Nov. 22, 1938 |
| 2,277,792 | Small | Mar. 31, 1942 |
| 2,308,134 | Westrope | Jan. 12, 1943 |
| 2,321,755 | Kost | June 15, 1943 |